United States Patent [19]
Benz et al.

[11] Patent Number: 5,616,523
[45] Date of Patent: Apr. 1, 1997

[54] METHOD OF MANUFACTURING SENSOR

[75] Inventors: Gerhard Benz, Boeblingen; Jiri Marek, Reutlingen; Frank Bantien, Ditzingen; Horst Muenzel, Reutlingen; Franz Laermer, Stuttgart; Michael Offenberg, Tuebingen; Andrea Schilp, Schwaebisch Gmuend, all of Germany

[73] Assignee: Robert Bosch GmbH, Stuttgart, Germany

[21] Appl. No.: 627,819

[22] Filed: Apr. 2, 1996

Related U.S. Application Data

[63] Continuation of Ser. No. 238,548, May 5, 1994, abandoned.

[30] Foreign Application Priority Data

May 6, 1993 [DE] Germany .............. 43 15 012.8

[51] Int. Cl.⁶ ................................. H01L 21/306
[52] U.S. Cl. .................. 438/50; 73/777; 438/739; 438/459; 438/52
[58] Field of Search .................. 437/901, 927, 437/974, 921, 228; 148/DIG. 73, DIG. 159; 73/718, 721, 724, 727, 777

[56] References Cited

U.S. PATENT DOCUMENTS

| | | | |
|---|---|---|---|
| 3,922,705 | 11/1975 | Yerman | 437/921 |
| 4,665,610 | 5/1987 | Barth | 437/901 |
| 4,925,805 | 5/1990 | van Ommen et al. | 437/927 |
| 5,006,487 | 4/1991 | Stokes | 437/927 |
| 5,059,556 | 10/1991 | Wilcoxen | 437/901 |
| 5,151,763 | 9/1992 | Marek et al. | 357/26 |
| 5,295,395 | 3/1994 | Hocker | 73/721 |
| 5,310,450 | 5/1994 | Offenberg | 437/901 |
| 5,332,469 | 7/1994 | Mastrangelo | 73/718 |
| 5,369,544 | 11/1994 | Mastrangelo | 73/718 |

FOREIGN PATENT DOCUMENTS

| | | |
|---|---|---|
| 4000903C1 | 8/1990 | Germany . |
| 91/19177 | 12/1991 | WIPO . |

OTHER PUBLICATIONS

S. Wolf, "Silicon Processing For The VLSI Era", vol. II, 1992, pp. 70–75.

S. Wolf "Silicon Processing For the VLSI Era" vol 2, 1990, p. 72–74.

K.E. Petersen, IEEE Proceedings 70(1982)443 "Si as Mechanical Mat. : Thin Cantelever Beams".

*Primary Examiner*—Charles L. Bowers, Jr.
*Assistant Examiner*—Leon Radomsky
*Attorney, Agent, or Firm*—Kenyon & Kenyon

[57] ABSTRACT

A method for manufacturing sensors from a multilayer plate with upper and lower monocrystalline silicon layers and an etching layer between them. The upper silicon layer is structured by the introduction of troughs therein extending down to the etching layer. Sensor structures, such as a bending beam that is used in an acceleration sensor, are created by etching the etching layer beneath a part of the silicon layer structured in this manner.

4 Claims, 2 Drawing Sheets

METHOD OF MANUFACTURING SENSOR

This is a continuation of application Ser. No. 08/238,548, filed on May 5, 1994, now abandoned.

FIELD OF THE INVENTION

The present invention relates to sensors and methods relating to their manufacture. More specifically, the present invention relates to methods of manufacturing sensors in a multilayer plate of silicon and the sensors thus manufactured.

BACKGROUND OF THE INVENTION

A method for manufacturing acceleration sensors, in which troughs are etched into a two-layer plate of monocrystalline silicon, is described in German Patent No. DE 40 00 903. The troughs delineate the structure of an acceleration sensor—with a bending blade suspended from a mount and a counterelectrode—in the upper layer of the two-layer silicon plate. The bending blade and counterelectrode are both fastened onto the second layer which forms a tabular substrate. The bending blade and the counterelectrode are insulated from this tabular substrate by a p-n junction. Etching of the tabular substrate beneath the bending blade makes the bending blade movable.

SUMMARY OF THE INVENTION

The present invention provides a method of manufacturing a sensor in a multilayer plate of silicon. The use of an etching layer between two silicon layers makes possible a manufacturing process with etching steps which can be controlled with particular accuracy. Because the etching steps are easily controllable, high dimensional accuracy can be achieved in the production of sensors, while process management is simple and uncomplicated.

A multilayer plate, for use in manufacturing a sensor in accordance with the present invention, can be fabricated with little need for complex equipment by joining two silicon plates. In the alternative, a multilayer plate can also be fabricated using only one silicon plate by implanting impurity atoms into the silicon plate.

A sensor according to the present invention exhibits particularly good insulation among the individual sensor components, thus allowing the use of a particularly simple measurement configuration to measure the capacitance between a bending blade and a counterelectrode of the sensor.

Additional aspects of the present invention include the use of insulating materials, which are also used for the etching layer, to insulate sensor components. Furthermore, insulating materials can be etched with particularly good selectivity with respect to silicon. By introducing troughs or diffusion zones, individual regions can be insulated from one another particularly well and with simple means. If the structure is etched away by using troughs, the multilayer plate need only be processed on one side. If, however, the etching layer is etched through an etching opening in the lower silicon layer, it is possible to arrange structures on the top surface that will also be affected when etching of the top surface occurs.

DETAILED DESCRIPTION OF THE DRAWINGS

Figure 1:
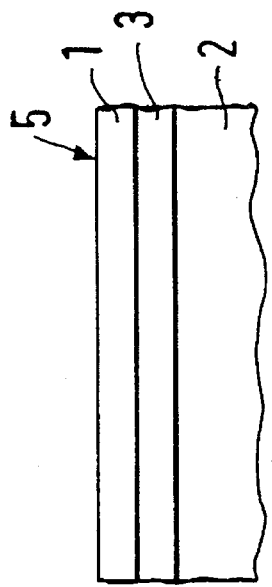
FIG. 1 shows a silicon plate with implanted impurity atoms.
Figure 2:
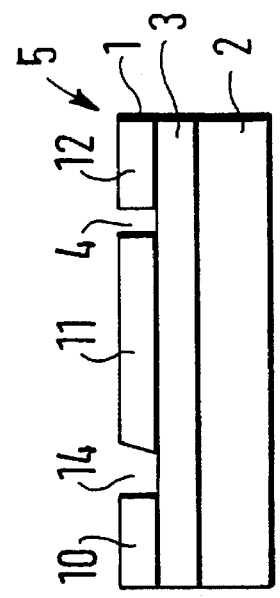
FIG. 2 shows a multilayer plate formed from the silicon plate of FIG. 1.

FIGS. 1 and 2 depict a process for manufacturing a multilayer plate 5. As shown in FIG. 1, impurity atoms are implanted into a silicon plate 23. The impurity atoms are implanted by means of a beam of accelerated impurity atoms, as depicted by the arrows. An impurity atom layer 24 forms in silicon plate 23 as a function of the energy of the impurity atom beam. Atoms suitable for such an implantation process include, for example, oxygen, which is intercalated into the silicon plate 23 with an energy of 200 keV. Reaction between the impurity atoms and the silicon of plate 23 is assisted by a baking process. Reaction between the implanted layer 24 and the silicon thus forms an etching layer 3, as shown in FIG. 2. With the implantation of oxygen, for example, heat treatment at more than 1200° C. for several hours forms a silicon oxide layer. This silicon oxide layer is suitable as an etching layer 3, and is embedded between two monocrystalline silicon layers 1 and 2. The silicon layer 2 consists of the remaining thickness of the silicon plate 23, and is particularly large compared to the two layers 1 and 3. Typical thicknesses for the layers 1 and 3, which are formed by the implantation of oxygen into a silicon wafer, are on the order of less than 1 micrometer. The thickness of the layer 1 can be increased by an epitactic growth process.

Figure 3:
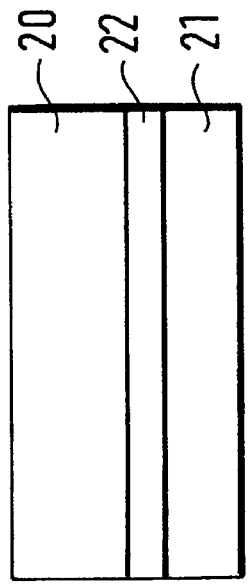
FIGS. 3–5 depict the production of a multilayer plate from two silicon plates.
Figure 5:
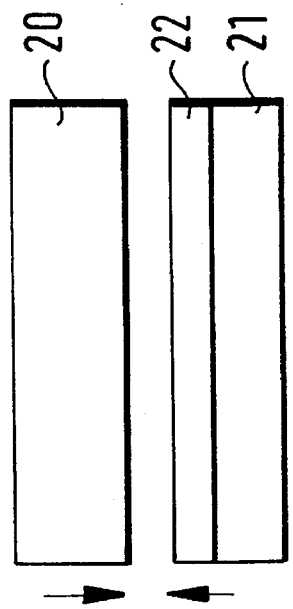
Figure 4:
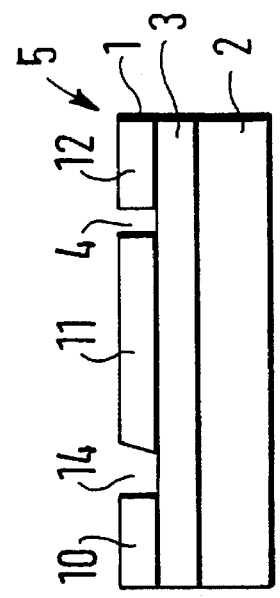

FIGS. 3 to 5 depict a second method for manufacturing a multilayer plate 5. This method begins with two silicon plates 20 and 21, as shown in FIG. 3. The two silicon plates 20 and 21 are joined to one another by means of a "bonding" process. One such bonding process consists of placing two silicon plates with smooth surfaces against one another, possibly after a chemical pretreatment of the surfaces, and then insolubly joining them to one another by means of a heat treatment. The joining surfaces of the silicon wafers can also be provided with an auxiliary layer that is not made of silicon. Suitable auxiliary layers are made, for example, of silicon oxide, silicon nitride, or glass. Auxiliary layers can be provided on only one joining surface or on both. In FIG. 3, the silicon plate 21 is provided with a silicon oxide layer 22.

The two silicon plates 21 and 22 are placed against one another, as indicated by the arrows in FIG. 3. Silicon plates 20 and 21 are joined to one another, as shown in FIG. 4, by means of a baking process, for example, by heating to more than 400° C. for several hours. The silicon plates 20 and 21 are permanently joined to one another by the silicon oxide layer 22. As shown in FIG. 5, the multilayer plate 5 is then formed, by subsequent processing, from the plate stack shown in FIG. 4.

In the subsequent processing, the thickness of the upper silicon plate 20 is reduced so the thickness of the upper silicon layer 1 of the multilayer plate 5 can be adjusted in a defined manner. The thickness of the upper silicon plate 20 can be reduced by mechanical surface machining, in which much of the thickness is first removed by grinding. The thickness of the silicon plate 20 can also be reduced by chemical etching methods. The thickness and surface finish of the upper silicon layer 1 are then adjusted with a polishing process, possibly also including a chemical polishing process. The thickness of the silicon layer 1 can also be adjusted by means of a prior doping of the silicon plate 20, for example, by embedding an etch-stopping layer into the silicon plate 20.

When a multilayer plate 5 is fabricated by implantation of impurity atoms, only a single silicon plate need be processed. This method therefore requires little starting material. However, suitable devices for implanting impurity atoms such as oxygen, are not used in standard semiconductor production, and therefore must be procured additionally for this process. Conversely, there is no need for such an implanting device when forming a multilayer plate 5 by joining two silicon plates to one another in a bonding process, although, in this case, two silicon plates are required.

Figure 6:
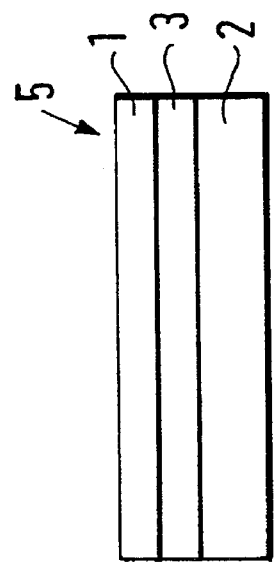
FIG. 6 depicts the insulation of individual regions on the upper layer of a multilayer plate.

FIG. 6 shows a multilayer plate 5 that has been divided into mutually isolated regions 10, 11, and 12 by an etching layer 3 and a trough 4 or an insulating diffusion zone 14. The silicon oxide etching layer 3 insulates upper silicon layer 1 from lower silicon layer 2. By introducing one or more troughs 4, or an insulating diffusion zone 14, as is used, for example, in bipolar technology, it is possible to divide the upper layer 1 into individual regions 10, 11, 12 that are insulated from one another. This type of insulation allows the manufacture of sensors in which individual components are particularly well insulated from one another.

Figure 7:
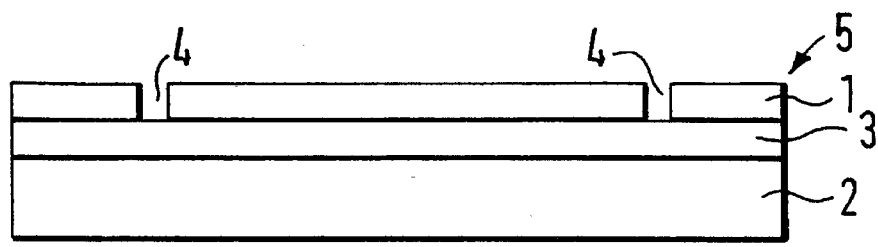
FIG. 7 depicts a manufacturing method for a sensor in accordance with the present invention.
Figure 8:
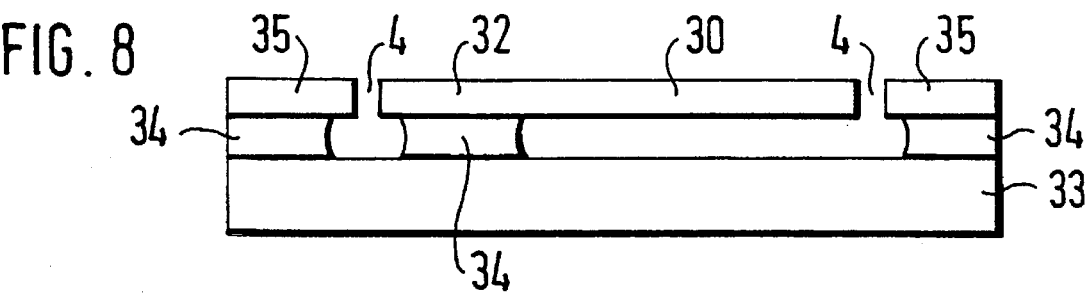
FIG. 8 is a cross-sectional view of an embodiment of a sensor in accordance with the present invention.
Figure 9:
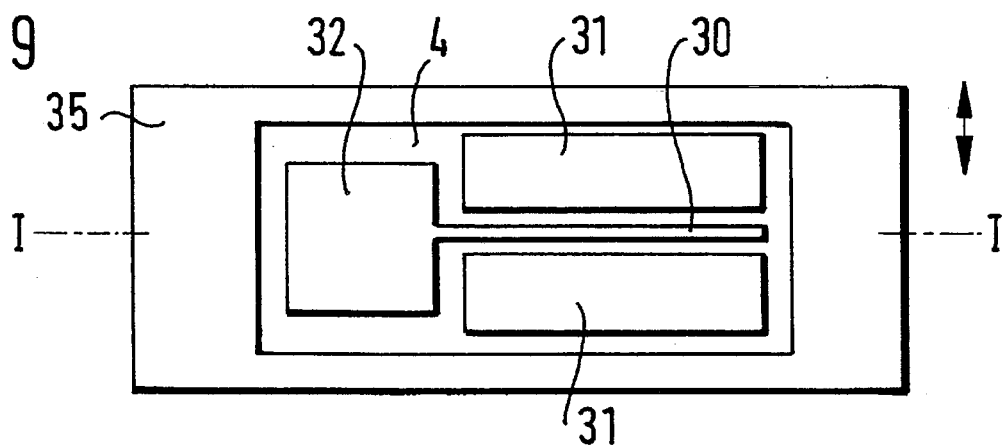
FIG. 9 is a plan view of the sensor whose cross-section is shown in FIG. 8.

FIG. 7 shows the manufacture, and FIGS. 8 and 9 show a first exemplary embodiment of a sensor in accordance with the present invention. FIG. 7 shows a multilayer plate 5 comprising an upper silicon layer 1, a lower silicon layer 2, and a silicon oxide etching layer 3 located between the upper and lower silicon layers 1 and 2. Troughs 4, which extend down to the etching layer 3, are introduced into the upper silicon layer 1.

FIG. 8 shows a cross-section of an acceleration sensor manufactured from the multilayer plate 5 of FIG. 7. The sensor comprises a bending blade 30 attached to a mount 32. The mount 32 is fastened onto a substrate 33 by means of an insulation layer 34. The sensor also has a frame 35 that is separated from the mount 32 and the bending blade 30 by a trough 4. The frame 35 is also anchored onto substrate 33 by means of an insulating layer 34.

FIG. 9 shows a plan view of the sensor whose cross-section is shown in FIG. 8 (with line I—I corresponding to the cross-section shown in FIG. 8.) In addition to the mount 32 and the bending blade 30 suspended therefrom, two counterelectrodes 31 are visible in the plan view. The counterelectrodes 31 are arranged on either side of the bending blade 30 and are again anchored to the substrate 33 by means of the insulating layers 34 (not visible in FIG. 9). Also evident in the plan view is the geometrical shape of the troughs 4, which are introduced into the upper silicon layer 1 and thus delineate the frame 35, the mount 32, the bending blade 30, and the counterelectrodes 31, all in the upper silicon layer 1.

The steps by which a sensor is manufactured, in accordance with the present invention, are illustrated in FIGS. 7 and 8. First, as shown in FIG. 7, troughs 4 are introduced into a multilayer plate 5 (which is formed in accordance with either FIGS. 1 and 2, or FIGS. 3 to 5.) The troughs 4 create, within the upper silicon layer 1, the structure of the mount 32, the bending blade 30, the counterelectrodes 31, and the frame 35. Because the troughs extend down to the silicon oxide layer 3, the individual sensor components are thus electrically insulated from one another.

In a further etching step, the silicon oxide layer beneath the bending blade 30 is then removed. This etching step is evident from FIG. 8, in which individual insulating layer regions 34 are formed, from the silicon oxide layer 3, beneath the mount 32 and the frame 35. The counterelectrodes 31 are also anchored onto the substrate 33 by means of individual insulating layer regions.

The bending blade 30 is configured so that it exhibits its lowest flexural strength in an axis parallel to the surface of the substrate 33. The bending blade 30 is thus particularly easily deflected by accelerations in the directions indicated by the double-headed arrow shown in FIG. 9. This deflection causes a change in the electrical capacitance between the bending blade 30 and the counterelectrodes 31. Acceleration can thus be measured by measuring the capacitance between the bending blade 30 and the counterelectrodes 31.

The troughs 4 are etched in using etching processes that produce edges as close to vertical as possible. This can be done, for example, with an anisotropic plasma etching process, such as reactive ion etching. Another possibility is to utilize the anisotropic etching properties of silicon with respect to fluid etching solutions, for example, aqueous KOH solutions. Vertical walls can, for example, be etched into silicon plates with a (110) surface orientation. Etching layer 3, beneath the bending blade 30, can also be etched with an etching fluid. Suitable etching fluids include hydrofluoric acid, which etches silicon oxide without attacking silicon structures.

The manufacturing method presented here is not confined to the manufacture of acceleration sensors according to FIG. 9. Other geometries for acceleration sensors, or other sensors such as those for pressure, force, or the like, can just as easily be implemented.

Figure 10:
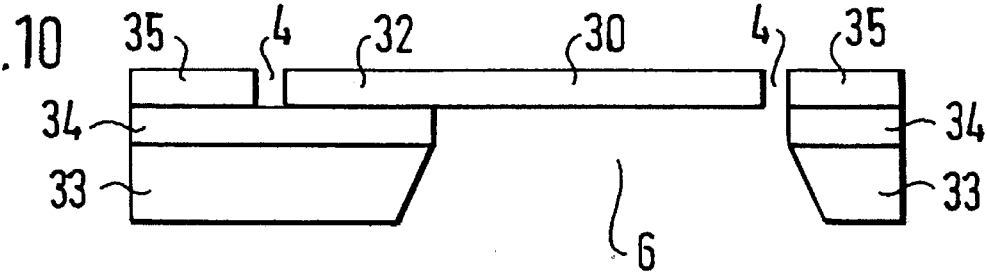
FIG. 10 is a cross-sectional view of another embodiment of a sensor in accordance with the present invention.

FIG. 10 depicts a further exemplary embodiment of an acceleration sensor in accordance with the present invention. This sensor comprises a bending blade 30 suspended from a mount 32. The bending blade 30 and the mount 32 are separated from the frame 35 by troughs 4. In plan view, the sensor of FIG. 10 corresponds to an acceleration sensor as shown in FIG. 9. The frame 35 and the mount 32 are once again joined to a substrate 33 by means of insulating layer regions 34. An opening 6 is introduced into the substrate 33 beneath the bending blade 30.

The sensor of FIG. 9 is manufactured from a multilayer plate 5, as depicted in FIG. 7. The troughs 4 once again structure the upper silicon layer 1 in such a way that the mount 32, the bending blade 30, and the counterelectrodes 31 are formed from the upper silicon layer 1. In a further etching step, the etching opening 6 is then introduced into the lower silicon layer 2, beneath the bending blade 30. The etching opening 6 is formed so that it is situated only immediately beneath the bending blade 30. The etching layer 3 is then removed, in a subsequent etching step, from beneath the bending blade 30 through the etching opening 6. Because the etching opening 6 is confined to the region immediately beneath the bending blade 30, the mechanical attachment between the mount 32 and the counterelectrodes 31 provided by the silicon oxide layer, is not impaired.

Each of the two manufacturing processes has specific advantages. Etching of the etching layer 3 from above by means of the troughs 4, eliminates the structuring of the lower silicon layer 2. As a result, two-sided processing of silicon plates is not necessary, thereby reducing production costs. However, when the etching layer 3 is etched from the underside through the etching opening 6 in the lower silicon layer 2, the etching layer 3 can be removed from beneath even large-area structures without thereby endangering retaining regions, such as the mount 32, due to undercutting. This makes it possible, for example, to provide the bending blade with a spatially large seismic mass, which increases the sensitivity of the sensor. Moreover, with this etching process, circuits in the upper silicon layer 1—used, for example, for initial evaluation of the sensor signals—can be better protected from attack by the etching medium used for etching layer 3. Also, because of the closer spatial proximity of such circuits to the sensor, made possible with such a process, any interference signals are thus minimized.

What is claimed is:

1. A method for manufacturing a sensor in a plate of monocrystalline silicon, comprising the steps of:

forming a multilayer plate in which an etching layer is arranged between an upper layer and a lower layer, the upper and lower layers being made of monocrystalline silicon and the etching layer being made of an insulating material selected from the group including silicon oxide, silicon nitride, and glass, wherein the step of forming the multilayer plate includes the steps of joining two plates together, with at least one of the plates having, on a surface by which it is joined to the other plate, a layer of material the same as that of the etching layer, and reducing the thickness of the upper silicon layer;

after forming the multilayer plate, forming a structure in the upper layer by introducing troughs that extend through the upper layer to the etching layers, wherein the structure includes a bending member, a mount attached to the bending member, and at least two counterelectrodes; and after forming the structure in the upper layer, removing a first portion of the etching layer by etching, a second portion of the etching layer remaining beneath the mount and the at least two counterelectrodes and anchoring the mount and the at least two counterelectrodes to the lower layer, the first portion of the etching layer being removed beneath the bending member, wherein the bending member is movable with respect to the mount in a direction parallel to a surface of the lower layer and between the at least two counterelectrodes in response to an acceleration only after the first portion of the etching layer is removed beneath the bending member, a distance between the bending member and the at least two counterelectrodes changing as a function of movement of the bending member.

2. The method according to claim 1, wherein the step of forming the structure in the upper layer includes the step of insulating parts of the upper layer from one another by introducing troughs and diffusion zones that extend through the upper layer to the etching layer.

3. The method according to claim 1, wherein the step of removing the etching layer beneath a part of the structure includes the step of applying an etching medium through the troughs to the etching layer beneath the part of the structure.

4. The method according to claim 1, wherein the step of removing the etching layer beneath a part of the structure includes the steps of:

introducing an etching opening into the lower silicon layer beneath the part of the structure; and applying an etching medium to the etching layer through the etching opening.

* * * * *